US012187246B2

(12) United States Patent
Shin et al.

(10) Patent No.: US 12,187,246 B2
(45) Date of Patent: Jan. 7, 2025

(54) METHOD OF CONTROLLING ELECTRIC BOOSTER FOR IMPROVING HETEROGENEOUS BRAKING PROPERTIES

(71) Applicants: Hyundai Motor Company, Seoul (KR); Kia Corporation, Seoul (KR)

(72) Inventors: Ung-Hee Shin, Yeosu-si (KR); Jae-Hun Shim, Hwaseong-si (KR); Joung-Hee Lee, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 364 days.

(21) Appl. No.: 17/724,188

(22) Filed: Apr. 19, 2022

(65) Prior Publication Data

US 2023/0066581 A1     Mar. 2, 2023

(30) Foreign Application Priority Data

Aug. 27, 2021    (KR) .................. 10-2021-0113881

(51) Int. Cl.
*B60T 13/16* (2006.01)
*B60T 7/04* (2006.01)
*B60T 13/74* (2006.01)

(52) U.S. Cl.
CPC ............ *B60T 13/162* (2013.01); *B60T 7/042* (2013.01); *B60T 13/745* (2013.01); *B60T 2270/60* (2013.01)

(58) Field of Classification Search
CPC ...... B60T 7/042; B60T 8/3275; B60T 8/4077; B60T 8/4086; B60T 8/409; B60T 8/3255; B60T 13/162; B60T 13/745; B60T 13/586; B60T 2270/60
See application file for complete search history.

(56) References Cited

U.S. PATENT DOCUMENTS

| 9,592,809 | B2 | 3/2017 | Vollert et al. |
| 9,630,604 | B2 * | 4/2017 | Benzler ................. B60T 13/146 |
| 9,889,836 | B2 * | 2/2018 | Mahnkopf ............ B60T 13/575 |

(Continued)

FOREIGN PATENT DOCUMENTS

| CN | 105774788 A | * | 7/2016 | |
| DE | 102014207456 A1 | * | 10/2015 | ............ B60T 13/745 |

(Continued)

OTHER PUBLICATIONS

Machine translation CN 105774788 (Year: 2016).*

*Primary Examiner* — Thomas J Williams
(74) *Attorney, Agent, or Firm* — Morgan, Lewis & Bockius LLP

(57) ABSTRACT

A method of controlling an electric booster including a reaction disk, a boosting body and a pedal push rod connected to a pedal and configured to come into contact with the reaction disk, the electric booster being subjected to braking control according to a braking map, includes: a first braking control step of controlling and generating a reaction force at normal times in accordance with a pedal effort by compressing and expanding a fluid while moving the pedal push rod; and a second braking control step of controlling and generating the reaction force in accordance with the pedal effort only in a condition in which the reaction disk and the pedal push rod are in contact with each other by detecting a size of an air gap between the reaction disk and the pedal push rod.

19 Claims, 13 Drawing Sheets

(56) References Cited

U.S. PATENT DOCUMENTS

| | | | | |
|---|---|---|---|---|
| 11,186,263 B2* | 11/2021 | Klein | .................... | B60T 13/745 |
| 2010/0242469 A1* | 9/2010 | Jungbecker | ........... | B60T 13/745 |
| | | | | 60/594 |
| 2012/0073286 A1* | 3/2012 | Takayama | ............. | B60T 13/745 |
| | | | | 60/538 |
| 2014/0028083 A1* | 1/2014 | Gerdes | ...................... | B60T 1/10 |
| | | | | 303/6.01 |
| 2023/0066581 A1* | 3/2023 | Shin | ...................... | B60T 13/162 |

FOREIGN PATENT DOCUMENTS

| | | | |
|---|---|---|---|
| DE | 112013006733 T5 * | 11/2015 | ................ B60T 1/10 |
| JP | 4380507 | 10/2009 | |
| KR | 10-2013-0127325 | 11/2013 | |
| KR | 10-2183953 | 11/2013 | |
| KR | 10-1729367 | 4/2017 | |
| KR | 10-2018-0085323 | 7/2018 | |
| KR | 10-2020-0016530 | 2/2020 | |
| KR | 10-2020-0056223 | 5/2020 | |
| KR | 10-2112307 | 5/2020 | |
| WO | WO-2012080157 A1 * | 6/2012 | ............ B60T 13/686 |

* cited by examiner

METHOD OF CONTROLLING ELECTRIC BOOSTER FOR IMPROVING HETEROGENEOUS BRAKING PROPERTIES

CROSS-REFERENCE TO RELATED APPLICATIONS

The present application claims priority to Korean Patent Application No. 10-2021-0113881, filed on Aug. 27, 2021, the entire contents of which is incorporated herein for all purposes by this reference.

BACKGROUND OF THE PRESENT DISCLOSURE

Field of the Present Disclosure

The present disclosure relates to a method of controlling an electric booster for improving heterogeneous braking properties, and more particularly, to a control method for improving heterogeneous braking properties when regenerative braking is released or when a knee point of a boosting body is reached.

Description of Related Art

Recently, the use of an electric booster braking system has increased to implement a vacuum-free brake system for improving fuel economy and implement regenerative braking cooperative control of an electric vehicle and an active braking actuator such as an emergency braking system.

In general, the electric booster braking system maintains most parts of a braking mechanism of a vacuum booster in the related art and boosts a hydraulic braking pressure with a differential pressure between an air pressure and a vacuum pressure like a vacuum booster. The electric booster braking system differs from the vacuum booster in terms of a boosting mechanism in which a force of an electric booster using electrical energy boosts a hydraulic braking pressure.

The types of electric booster braking system may be classified into two types depending on whether a pedal simulator is mounted. The electric booster braking system mounted with the pedal simulator blocks a driver's pedal effort, which is generated when the driver pushes a brake pedal, and performs the braking only by use of the force of the electric booster. Regarding pedal pressure feel by the driver, a reaction force generated by a spring or a rubber damper of the pedal simulator allows the driver to recognize pedal pressure feel similar to pedal pressure feel provided by a vacuum booster braking system in the related art.

However, in a situation in which regenerative braking is released in a regenerative braking vehicle, the pedal pressure feel becomes light due to non-contact between a reaction disk and a pedal push rod of the electric booster. Furthermore, when the pedal push rod and the reaction disk come into contact with each other too rapidly when a limit point of a booster motor is reached, the pedal pressure feel becomes heavy.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method of controlling an electric booster for improving heterogeneous braking properties in accordance with a pedal effort in a situation in which regenerative braking is released situation and in a section in which a knee point of a booster motor is reached.

An exemplary embodiment of the present disclosure provides a method of controlling an electric booster for improving heterogeneous braking properties, the electric booster including a reaction disk, a boosting body configured to perform a translational motion by receiving driving power of a booster motor and generate a clamping force to the reaction disk, and a pedal push rod connected to a pedal and configured to come into contact with the reaction disk, the electric booster being subjected to braking control according to a braking map, the method including: a first braking control step of controlling and generating a reaction force at normal times in accordance with a pedal effort by compressing and expanding a fluid while moving the pedal push rod; and a second braking control step of controlling and generating the reaction force in accordance with the pedal effort only in a condition in which the reaction disk and the pedal push rod are in contact with each other by detecting a size of an air gap between the reaction disk and the pedal push rod.

A normal-time reaction force structure used in the first braking control step may include: a pedal return rod connected to one side of the pedal push rod; and a housing into which the pedal return rod is inserted, the housing being configured to guide a movement of the pedal return rod, and a closed space of the fluid may be formed between the pedal return rod and the housing.

The size of the air gap may be determined in consideration of an initial state of the air gap and a relative movement amount between a stroke of the pedal push rod and a stroke of the boosting body.

The first braking control may be performed when the air gap is formed in a situation in which regenerative braking is performed and then released.

The first braking control and the second braking control may be simultaneously performed when the size of the air gap is 0 after the regenerative braking is released.

The first braking control may be performed when the air gap is formed before a knee point at which the boosting body cannot move any further.

The method may include controlling braking performance so that the pedal push rod and the reaction disk come into contact with each other before the knee point to prepare for a rapid increase in reaction force by pedal force at the knee point and a buffer operation is implemented by slowly increasing the reaction force of the reaction disk by controlling motor torque.

The method may include setting the size of the air gap to position a point at which the pedal push rod and the reaction disk are in contact with each other between a regenerative braking ending point in time and the knee point.

The method may include performing control to obtain a high braking force with respect to a pedal stroke by increasing torque of the booster motor with respect to the pedal stroke to make booster braking performance sport.

The method may include performing control to determine a stroke when a motor limit is reached and set a point at which the pedal push rod and the reaction disk are in contact with each other before the motor limit is reached to prevent the knee point from being reached before the point in time at which the pedal push rod and the reaction disk are in contact with each other.

The method may include performing control to obtain a low braking force with respect to a pedal stroke by decreasing torque of the booster motor with respect to the pedal stroke to make booster braking performance comfort.

The method may include performing control to set a point at which the pedal push rod and the reaction disk are in contact with each other after a pedal stroke corresponding to regenerative braking release deceleration.

According to an exemplary embodiment of the present disclosure, the following effects are achieved.

First, when the regenerative braking is performed and the situation in which the regenerative braking is released, the conditional reaction force structure prevents the generation of the reaction force of the reaction disk, and the normal-time reaction force structure generates the reaction force in accordance with the pedal input. Therefore, it is possible to prevent braking heterogeneity caused by non-contact of the reaction disk which may occur when the regenerative braking is released.

Second, it is possible to prevent the braking heterogeneity by applying the braking performance buffer section by adjusting the air gap and the motor torque at the motor limit point (knee point) of the electric booster.

Third, it is possible to variously tune the braking performance by adjusting the magnitude of the hydraulic braking force in accordance with the pedal stroke by controlling the torque of the booster motor.

Fourth, the method of controlling the electric booster for improving heterogeneous braking properties according to an exemplary embodiment of the present disclosure does not require a pedal simulator.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
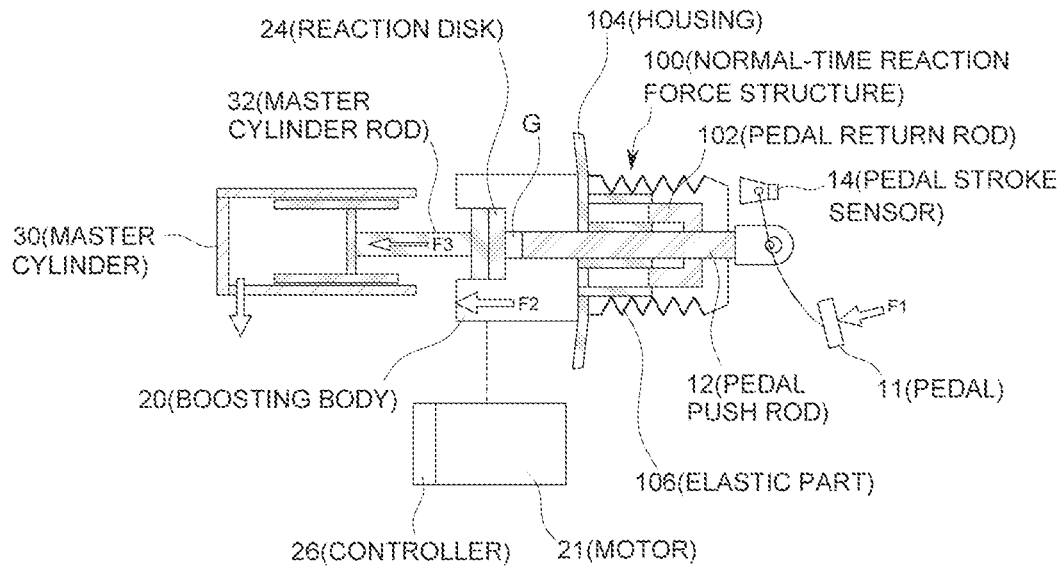
FIG. 1 is a view schematically illustrating a structure of an electric booster used for a method of controlling an electric booster for improving heterogeneous braking properties according to the exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of a method of controlling an electric booster for improving heterogeneous braking properties according to an exemplary embodiment of the present disclosure will be described in detail with reference to the drawings. Terms or words used herein should not be interpreted as being limited to general or dictionary meanings and should be interpreted as meanings and concepts which conform to the technical spirit of the present disclosure based on a principle that an inventor can appropriately define a concept of a term to describe his or her own invention by the best method.

Figure 2:
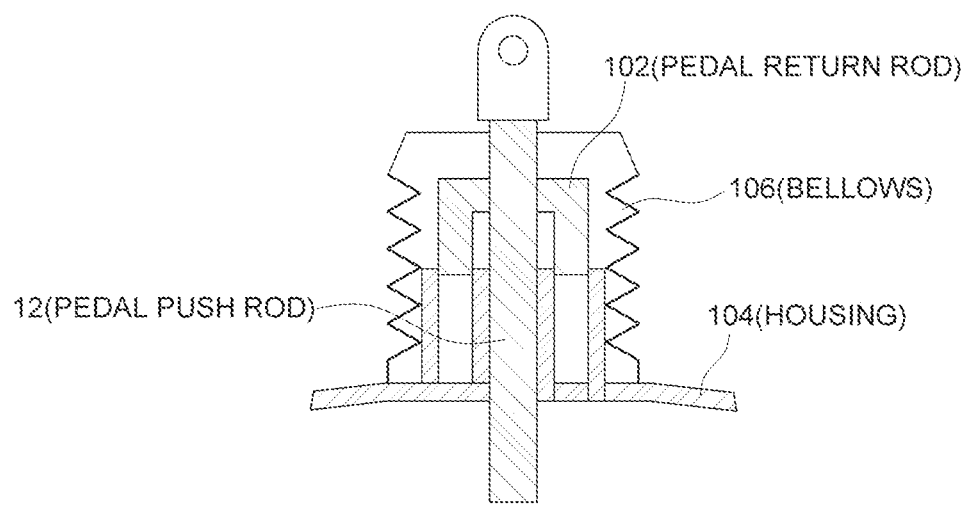
FIG. 2 is a view exemplarily illustrating a normal-time reaction force structure according to the exemplary embodiment of the present disclosure.
Figure 3A:
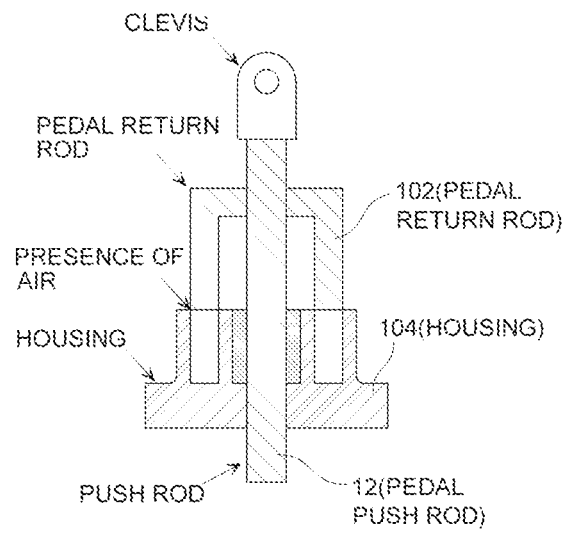
FIG. 3A and FIG. 3B are views exemplarily illustrating an operating state of the normal-time reaction force structure according to the exemplary embodiment of the present disclosure.
Figure 3B:
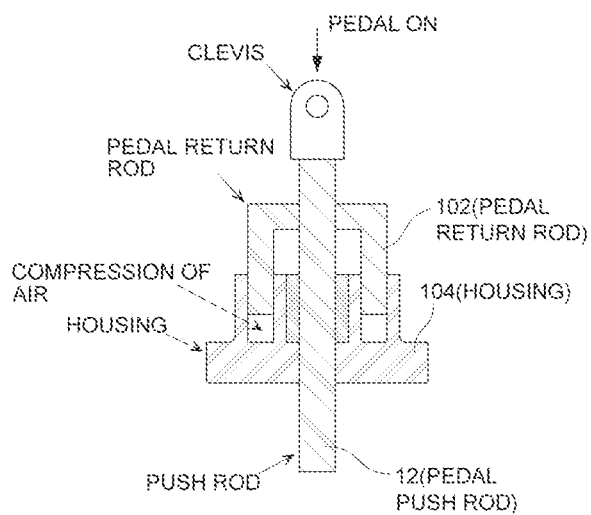

FIG. 1 is a view schematically illustrating a structure of an electric booster used for a method of controlling an electric booster for improving heterogeneous braking properties according to the exemplary embodiment of the present disclosure, FIG. 2 is a view exemplarily illustrating a normal-time reaction force structure according to the exemplary embodiment of the present disclosure, and FIG. 3A and FIG. 3B are views exemplarily illustrating an operating state of the normal-time reaction force structure according to Referring to FIG. 1, an electric booster according to various exemplary embodiments of the present disclosure includes a pedal 11, a boosting body 20, and a master cylinder 30.

The pedal 11 is connected to a pedal push rod 12. Therefore, the pedal push rod 12 may move forward when a pedal effort F1 is applied to the pedal 11. A pedal stroke sensor 14 is connected to the pedal 11. The pedal stroke sensor 14 detects a movement amount of the pedal 11 made by the pedal effort.

The boosting body 20 receives a rotational force from a motor 22 and a speed reducer and converts the rotational force into a translational motion. A reaction disk 24 is mounted on the boosting body 20. The reaction disk 24 is made of an elastic material and may be elastically deformed when coming into contact with the pedal push rod 12. An air gap G is formed in a state in which the pedal push rod 12 and the reaction disk 24 are not in contact with each other. The reaction disk 24 is connected to a master cylinder rod 32. When the pedal push rod 12 moves forward and comes into contact with the reaction disk 24, a clamping force is transmitted to the master cylinder rod 32.

A boosting body stroke sensor is connected to the motor 21 to detect a movement amount of the boosting body 20. A controller 26 is connected to the motor 21 to control an operation of the motor 21, collect sensing information of the pedal stroke sensor 14, and collect sensing information of the boosting body stroke sensor.

The master cylinder 30 generates a piston pressure by the clamping force of the master cylinder rod 32 and generates a hydraulic braking pressure. Meanwhile, a force F3 applied to the master cylinder rod 32 is a resultant force of the pedal effort F1 and a boosting body moving force F2.

The electric booster according to the exemplary embodiment of the present disclosure has a normal-time reaction force structure 100. Referring to FIG. 2, the normal-time reaction force structure 100 includes a pedal return rod 102 and a housing 104.

The pedal return rod 102 is connected to one side or two opposite sides of the pedal push rod 12. Therefore, the pedal return rod 102 may also move in a coaxial direction together with the pedal push rod 12.

The housing 104 is mounted at one side of the boosting body 20. The housing 104 has a closed space which is closed as one end portion of the pedal return rod 102 is inserted. As illustrated in FIGS. 3A and 3B, when the pedal push rod 12 is moved forward by the pedal effort F1, the pedal return rod 102 is also moved forward so that a fluid (air or a liquid) provided in the closed space of the housing 104 is compressed. When the pedal effort F1 is eliminated, the fluid provided in the closed space of the housing 104 is expanded. Meanwhile, the normal-time reaction force structure 100 further includes a bellows 106. The normal-time reaction force structure transmits a normal-time reaction force to the driver as the pedal 11 moves.

Figure 4A:
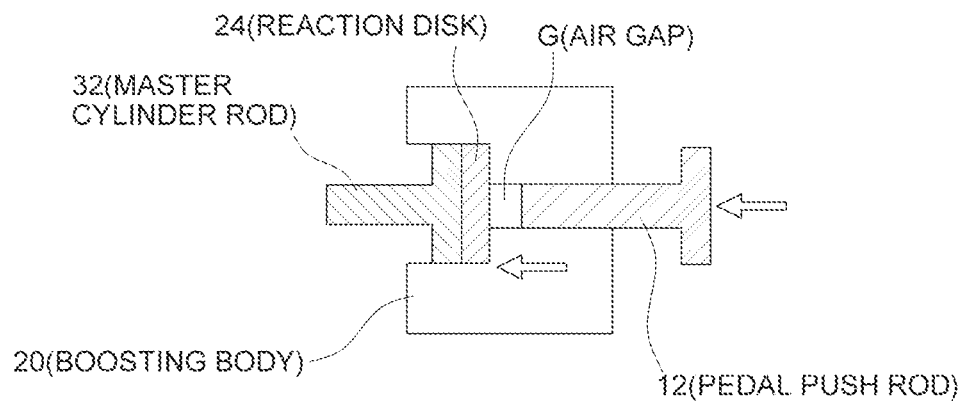
FIG. 4A, FIG. 4B and FIG. 4C are views exemplarily illustrating an operating state of a conditional reaction force structure according to the exemplary embodiment of the present disclosure.
Figure 4B:
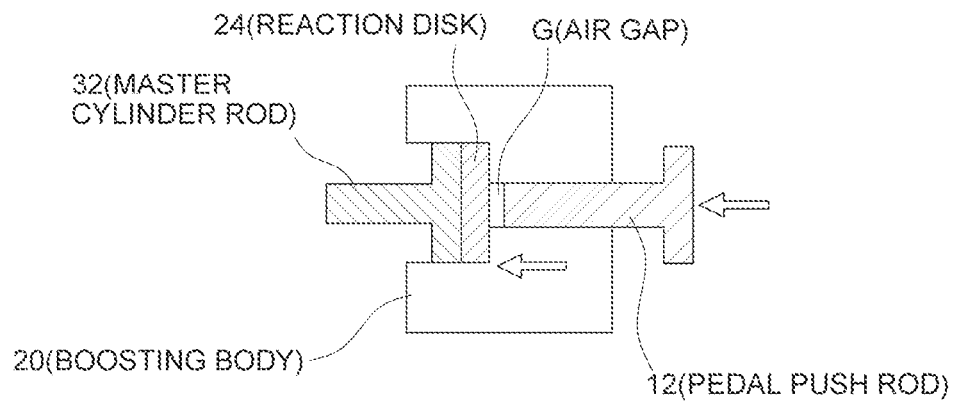
Figure 4C:
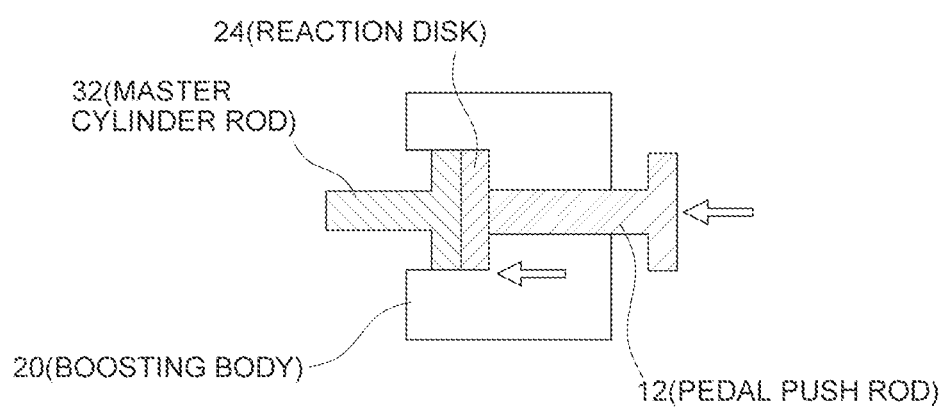

FIG. 4A, FIG. 4B and FIG. 4C are views exemplarily illustrating an operating state of a conditional reaction force structure according to the exemplary embodiment of the present disclosure.

Referring to FIG. 4A, FIG. 4B and FIG. 4C, the conditional reaction force structure according to the exemplary embodiment of the present disclosure does not generate a reaction force (see FIG. 4A and FIG. 4B) when the pedal push rod 12 and the reaction disk 24 are not in contact with each other and the air gap G is not formed. The conditional reaction force structure generates the reaction force (see FIG. 4C) only in the state in which the pedal push rod 12 and the reaction disk 24 are in contact with each other.

Figure 5:
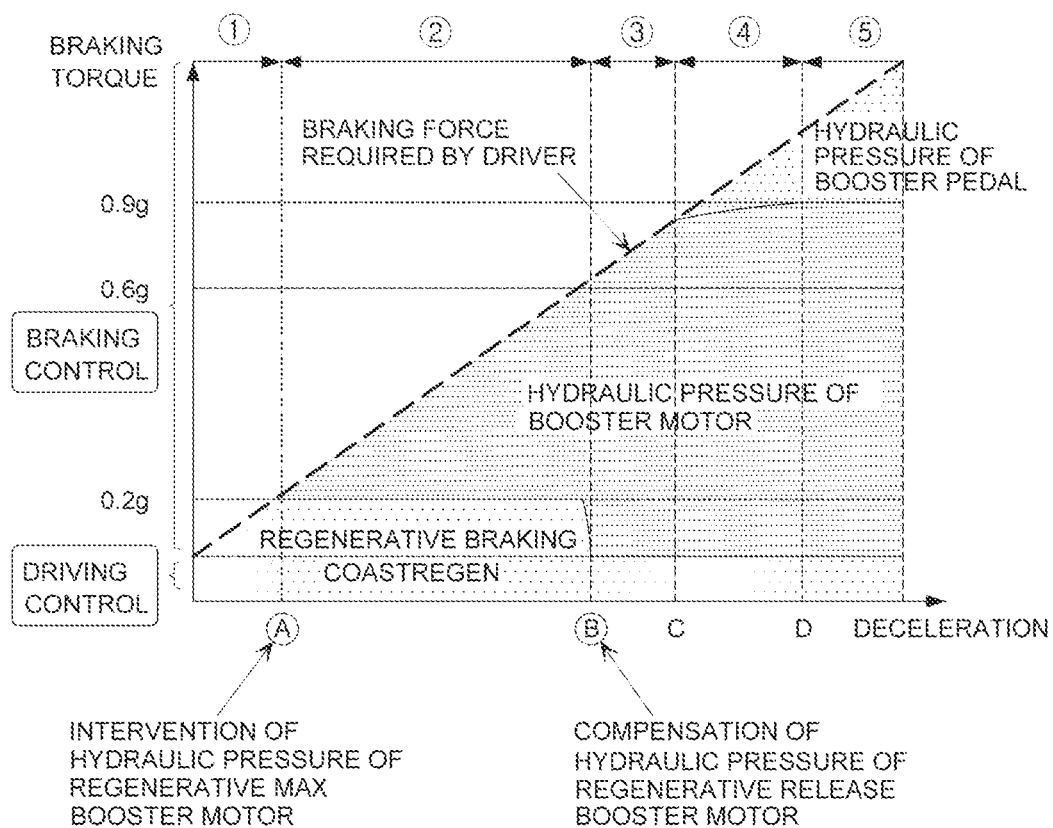
FIG. 5 is a braking map illustrating braking torque in accordance with the method of controlling the electric booster for improving heterogeneous braking properties according to the exemplary embodiment of the present disclosure at the time of performing regenerative braking and at the time of releasing regenerative braking.
Figure 6:
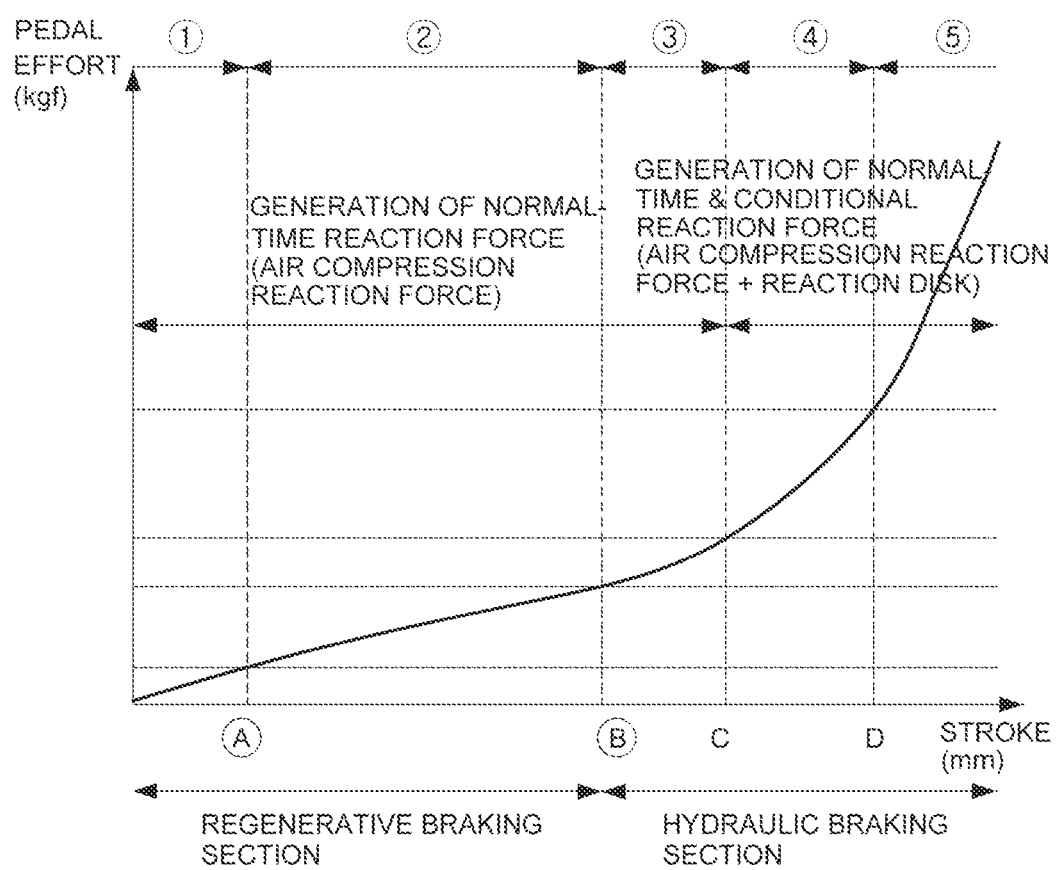
FIG. 6 is a graph illustrating a pedal effort curve in accordance with pedal stroke in FIG. 5.

FIG. 5 is a braking map illustrating braking torque in accordance with the method of controlling the electric booster for improving heterogeneous braking properties according to the exemplary embodiment of the present disclosure at the time of performing regenerative braking and at the time of releasing regenerative braking, and FIG. 6 is a graph illustrating a pedal effort curve in accordance with pedal stroke in FIG. 5.

In the related art, the following braking control is performed at the time of performing the regenerative braking and at the time of releasing the regenerative braking. First, at the time of performing the regenerative braking, a regenerative braking force is generated by a vehicle drive motor, and the pedal push rod 12 and the boosting body 20 move forward and push the reaction disk 24 to generate a hydraulic pressure braking force. In the instant case, the reaction force is generated as the pedal push rod 12 comes into contact with the reaction disk 24 by the input to the pedal 11 so that the pedal pressure feel is applied. Meanwhile, at the time of releasing the regenerative braking, the boosting body 20 moves forward and pushes the reaction disk 24 to generate an additional hydraulic braking force and compensate for the regenerative braking force released from the vehicle drive motor. In the instant case, the pedal push rod 12 is in a stopped state, and only the reaction disk 24 moves forward so that the pedal push rod 12 and the reaction disk 24 are spaced from each other. Because the reaction force is not generated by the reaction disk 24, heterogeneity occurs in which the pedal pressure feel becomes light.

Referring to FIG. 5, to solve the present problem, the method of controlling the electric booster for improving heterogeneous braking properties according to the exemplary embodiment of the present disclosure applies the conditional reaction force structure in which the air gap G is adjusted to prevent the pedal push rod 12 from coming into contact with the reaction disk 24 in the situation in which the regenerative braking is performed and the situation in which the regenerative braking is released. That is, in the situation in which the regenerative braking is released, the control is performed not to generate the reaction force according to the pedal effort in accordance with the conditional reaction force structure, and the control is performed to generate only the reaction force according to the pedal effort in accordance with the normal-time reaction force structure.

The regenerative braking is performed within the air gap G set by the conditional reaction force structure. When the regenerative braking force reaches a maximum force (point A in FIG. 5), the control is performed to generate an additional braking force with the hydraulic braking force generated by controlling motor torque. At the time of ending the regenerative braking (point B in FIG. 5), the control is performed to compensate for the regenerative braking force released from the drive motor by generating the hydraulic pressure by controlling the booster motor. Thereafter, the pedal stroke and the boosting body stroke are measured, a relative movement amount of stroke of the boosting body and the pedal push rod 12 in the braking situation is compared with an initial air gap to determine whether the pedal push rod 12 and the reaction disk 24 are in contact with each other. When the pedal push rod 12 and the reaction disk 24 come into contact with each other (point C in FIG. 5), the control is performed to generate the hydraulic braking force according to the pedal effort together with the hydraulic braking force by the booster motor 21.

Referring to FIG. 6, after releasing the regenerative braking, the normal-time reaction force structure is applied before a point in time (point C in FIG. 6) at which the pedal push rod 12 and the reaction disk 24 are in contact with each other, and the normal-time reaction force structure and the conditional reaction force structure are applied to form the pedal effort after the point in time at which the pedal push rod 12 and the reaction disk 24 are in contact with each other. Therefore, the pedal effort slowly increases so that the braking heterogeneity is minimized.

Figure 7:
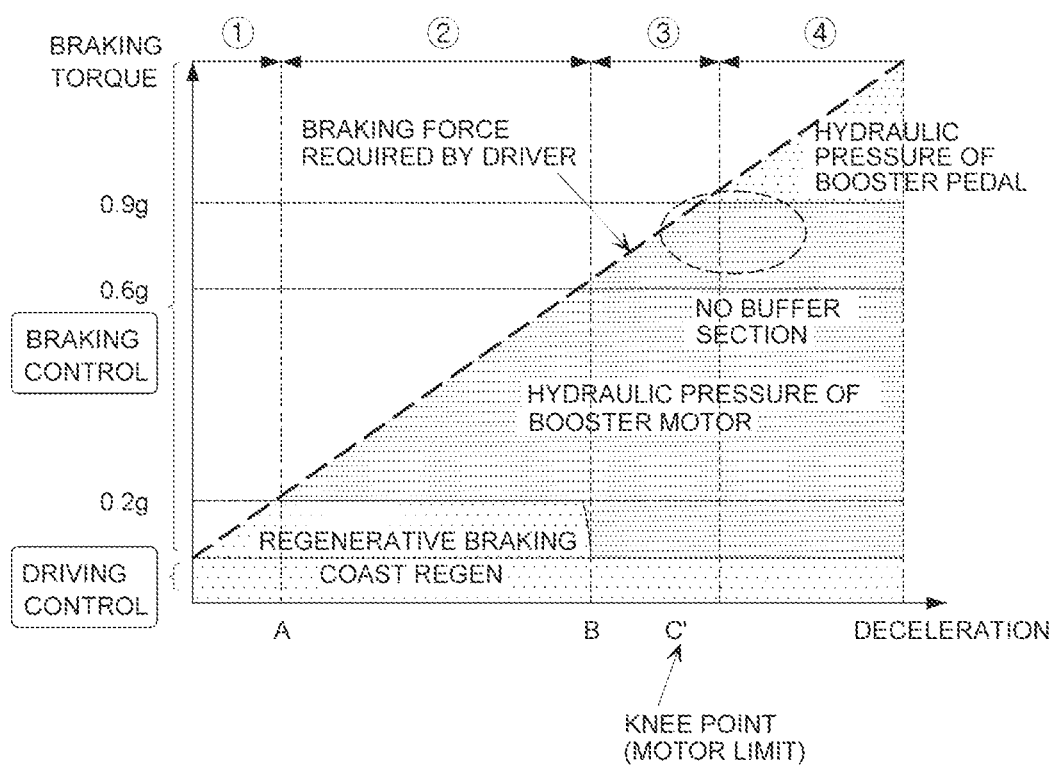
FIG. 7 is a braking map illustrating braking torque in accordance with an electric booster control method in the related art in a knee point section of a booster motor.
Figure 8:
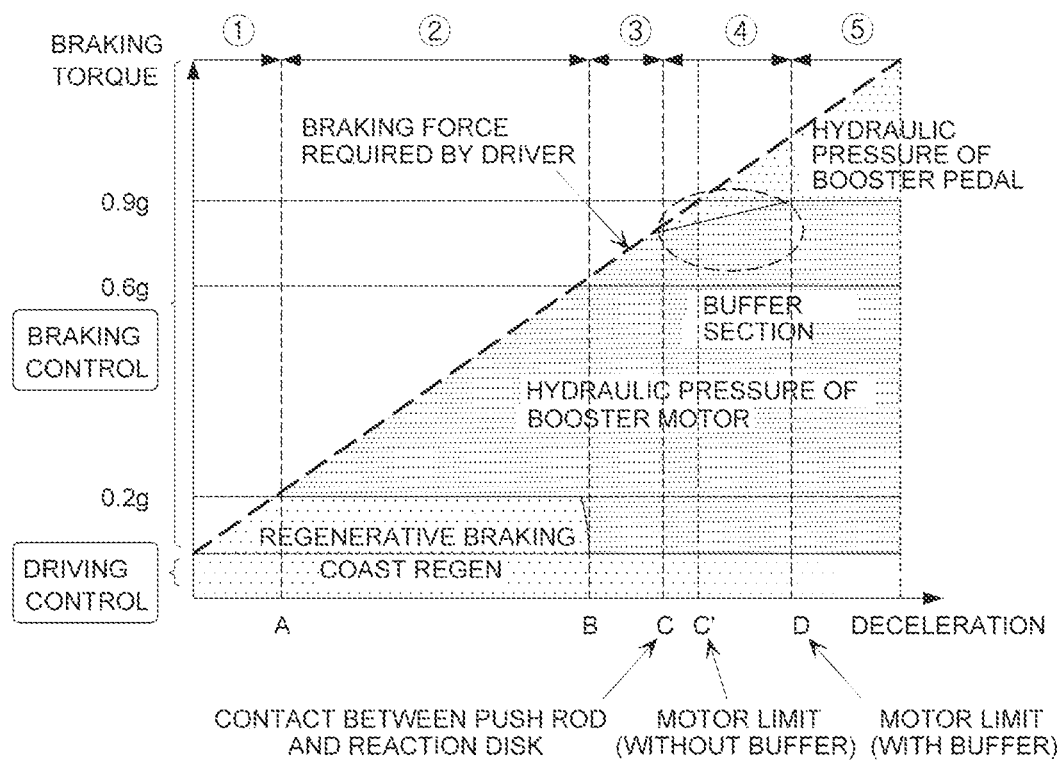
FIG. 8 is a braking map illustrating braking torque in accordance with the method of controlling the electric booster for improving heterogeneous braking properties according to the exemplary embodiment of the present disclosure in a knee point section of a booster motor.
Figure 9A:
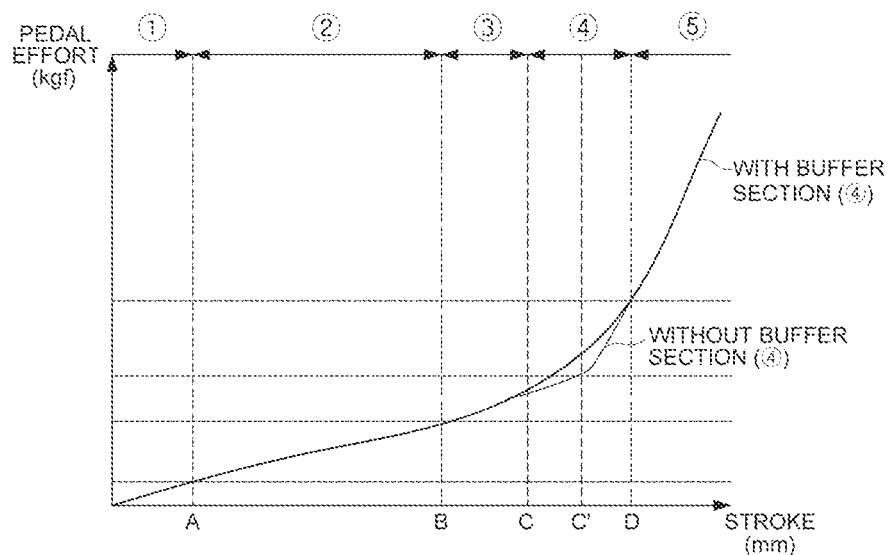
FIG. 9A and FIG. 9B are a pedal effort graph in accordance with pedal stroke according to the presence or absence of a buffer section and a deceleration graph in accordance with the pedal effort in the knee point section of the booster motor.
Figure 9B:
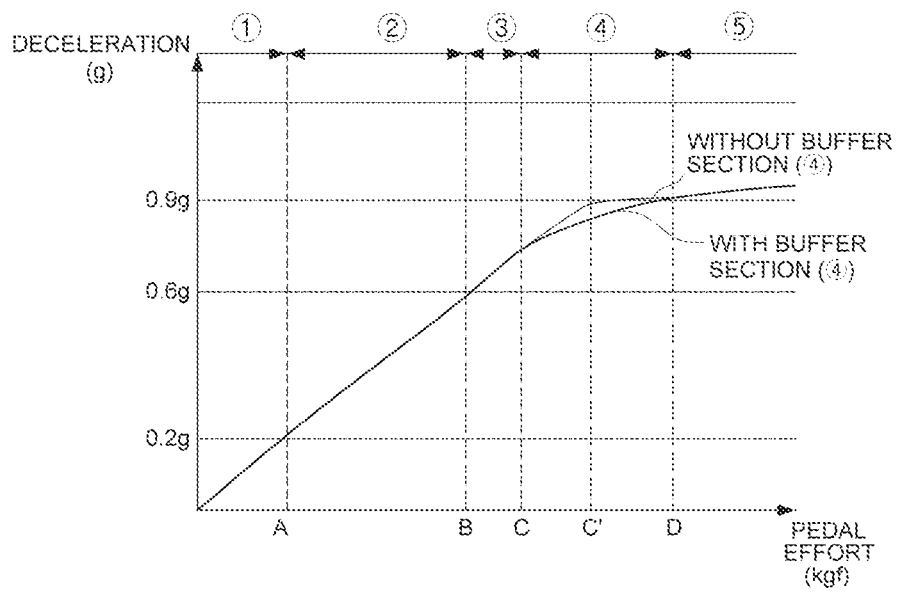

FIG. 7 is a braking map illustrating braking torque in accordance with an electric booster control method in the related art in a knee point section of a booster motor, FIG. 8 is a braking map illustrating braking torque in accordance with the method of controlling the electric booster for improving heterogeneous braking properties according to the exemplary embodiment of the present disclosure in a knee point section of a booster motor, and FIG. 9A and FIG. 9B are a pedal effort graph in accordance with pedal stroke according to the presence or absence of a buffer section and a deceleration graph in accordance with the pedal effort in the knee point section of the booster motor.

Because the air gap G has a small size, the reaction force is formed as the pedal push rod 12 comes into contact with the reaction disk 24 immediately after the input of the pedal 11. Thereafter, when a knee point section, which is a point (a limit point of the booster motor) at which the boosting body 20 cannot be moved forward by the booster motor 21 any further, is reached, the hydraulic pressure cannot be generated any further by additionally pushing the boosting body 20, and only the pedal push rod 12 moves forward and generates the hydraulic pressure only by the force of the pedal 11. In the instant case, when the reaction force is rapidly increased, braking heterogeneity occurs in which the pedal pressure feel of the driver becomes heavy.

Referring to FIG. 7, when a knee point C' is reached, the hydraulic pressure is generated by the pedal 11. In the instant case, the braking heterogeneity occurs in which the pedal pressure feel becomes heavy. That is, in the electric booster control in the related art, there is no buffer section for improving heterogeneous pedal properties.

Referring to FIG. 8, according to the method of controlling the electric booster for improving heterogeneous braking properties according to the exemplary embodiment of the present disclosure, an intervention point in time of the hydraulic braking force is controlled by the force of the pedal 11 by adjusting the air gap of the conditional reaction force structure and controlling the motor torque. That is, the pedal reaction force is formed by compressing the air through the normal-time reaction force structure within a section (points B and C) in which the air gap G is present before the pedal push rod 12 comes into contact with the reaction disk 24. To prepare for a rapid increase in reaction force by the force of the pedal 11 at the knee point C', the braking performance is controlled so that the pedal push rod 12 and the reaction disk 24 come into contact with each other before the knee point and a buffer operation is implemented by slowly increasing the reaction force of the reaction disk 24 by controlling the motor torque. The present section is referred to as a buffer section.

The control is performed to generate the hydraulic braking force only by the force of the booster motor 21 before the buffer section (before point C) and the hydraulic braking force generated by the pedal 11 and the motor 21 is distributed by controlling the motor torque from the buffer section point in time C.

Meanwhile, the size of the air gap G is set so that the point (point C) at which the pedal push rod 12 and the reaction disk 24 are in contact with each other is positioned between a regenerative braking ending point in time (point B) and the knee point D. In the instant case, at the motor limit reached point C' when there is no buffer section, a total braking force is determined by a sum of a coast regeneration regenerative braking force and a motor hydraulic braking force. In the instant case, deceleration and pedal stroke, when the motor hydraulic braking force reaches the limit, is calculated and determined in advance. The regenerative braking ending point B is positioned at smaller stroke than the point C' determined in advance so that the pedal push rod 12 comes into contact with the reaction disk 24 after releasing the regenerative braking. The buffer section point in time C is set between point B and point C'. In the instant case, the motor limit reached point (point D) is determined after point C. When point C is positioned within point B, the heterogeneity occurs due to an additional reaction force of the pedal 11 at the time of releasing the regenerative braking. If point C is positioned after point D, the motor limit is reached in the air gap G section, and an ineffective stroke section is generated, which may cause a loss of braking force.

Next, the application principle of the buffer section (points C and D) will be described.

FIGS. 9A and 9B are views exemplarily illustrating a result of comparing braking forces and braking performances based on whether the buffer section is applied before the knee point. When the buffer section is applied before the knee point, the pedal push rod 12 and the reaction disk 24 come into contact with each other, and the hydraulic braking force begins to be generated by the force of the pedal 11. In the instant case, an overall hydraulic braking force may be controlled by adjusting the hydraulic pressure by controlling torque of the booster motor. If the knee point is reached first without applying the buffer section, a situation in which the additional hydraulic braking force cannot be generated only by the force of the pedal 11 is reached. Furthermore, the reaction force by the reaction disk 24 is rapidly increased, and the pedal effort is rapidly increased in comparison with the pedal stroke/deceleration. As a result, the braking heterogeneity may occur in which the driver feels that the pedal 11 is heavy. In the case in which the pedal push rod 12 and the reaction disk 24 come into contact with each other in the buffer section before the knee point and the reaction force of the reaction disk 24 of the conditional reaction force structure is slowly increased by controlling the motor torque, it is possible to improve the heterogeneous properties and minimize a change in pedal pressure feel felt by the driver when the knee point is reached.

Figure 10A:
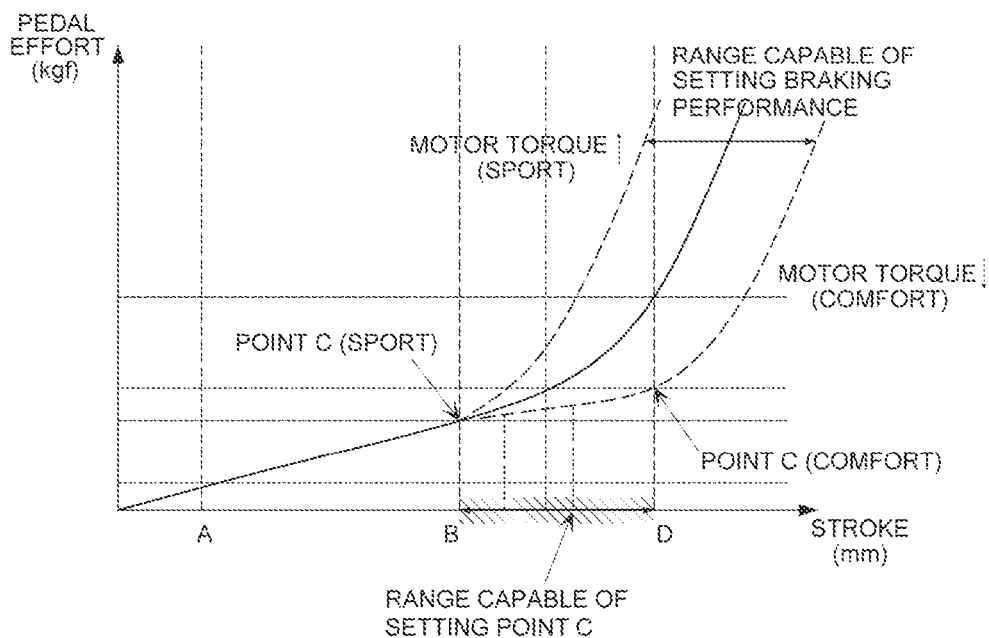
FIG. 10A and FIG. 10B are graphs for tuning braking performance of the electric booster according to the exemplary embodiment of the present disclosure.
Figure 10B:
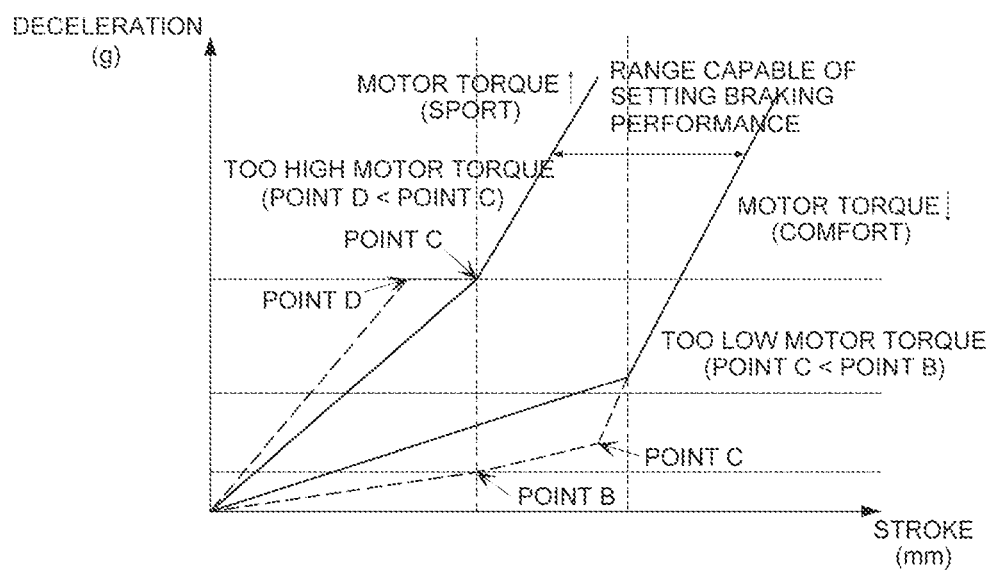

FIGS. 10A and 10B are graphs for tuning braking performance of the electric booster according to the exemplary embodiment of the present disclosure. FIG. 10A is a graph illustrating the pedal effort with respect to the pedal stroke, and FIG. 10B is a graph illustrating the deceleration with respect to the pedal stroke.

As illustrated in FIGS. 10A and 10B, various braking performances of the vehicle may be tuned by changing deceleration with respect to the pedal stroke by controlling the motor torque at the time of controlling the buffer section before the knee point.

To make the booster braking performance sport, a high braking force may be obtained with respect to the pedal stroke by increasing the torque of the booster motor with respect to the pedal stroke. In the instant case, if the motor torque is too high, the knee point (point D) may be reached before the point C is reached. In the instant case, there may occur a section in which because the motor limit is reached, the deceleration does not increase even though the pedal input is increased. Furthermore, a loss of braking force and braking heterogeneity occur. Therefore, the stroke when the motor limit is reached is determined, and the point (point C) is set at which the pedal push rod 12 and the reaction disk 24 come into contact with each other before the motor limit is reached.

To make the booster braking performance comfortable, a low braking force may be obtained with respect to the pedal stroke by decreasing the torque of the booster motor with respect to the pedal stroke. If the motor torque is too low, the point C may be reached before the regenerative braking release point in time because the point C is positioned at low deceleration. In the instant case, the reaction force by the pedal 11 is added at the time of releasing the regenerative braking, which is contrary to the present technology that permits only the normal-time reaction force structure at the time of releasing the regenerative braking. Furthermore, the braking heterogeneity may occur. Therefore, the point (point C) at which the pedal push rod 12 and the reaction disk 24 come into contact with each other is set after the pedal stroke corresponding to the regenerative braking release deceleration. At the time of tuning the braking performance by changing the deceleration with respect to the pedal stroke, the braking performance needs to be set to position the point C between point B and point D by controlling the buffer section before the knee point.

FIG. 11A, FIG. 11B, FIG. 11C, FIG. 11D, FIG. 11E and FIG. 11F are views exemplarily illustrating operating states from an initial state of the method of controlling the electric booster for improving heterogeneous braking properties according to the exemplary embodiment of the present disclosure.

Figure 11A:
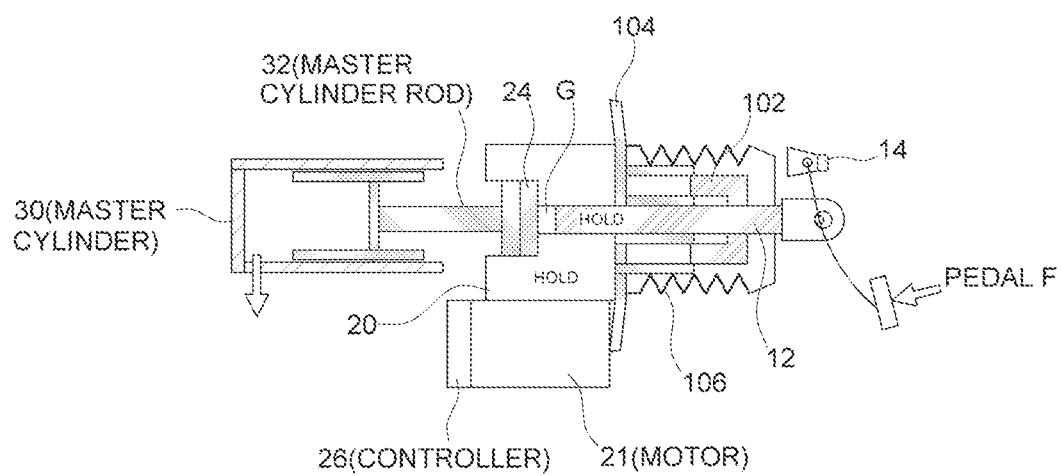
FIG. 11A, FIG. 11B, FIG. 11C, FIG. 11D, FIG. 11E and FIG. 11F are views exemplarily illustrating operating states from an initial state of the method of controlling the electric booster for improving heterogeneous braking properties according to the exemplary embodiment of the present disclosure.

FIG. 11A illustrates an initial state of the electric booster (system ready state). In the instant case, the pedal push rod stroke Sp by the pedal 11 is 0, and the boosting body stroke Sm by the motor 21 is 0. In the instant case, the air gap G may be $G=Sm-Sp+d0$ (the air gap in the initial state). Because there is no input of the pedal 11, both the pedal push rod 12 and the boosting body 20 are maintained in a stopped state. Because there is no force for pushing the reaction disk 24, the booster output and the hydraulic braking force are not generated. The regenerative braking force is not generated even in the vehicle drive motor. Therefore, a total braking force is 0. Because there is no input of the pedal 11, the normal-time reaction force structure and the conditional reaction force structure are not made. Therefore, the pedal effort is 0.

Figure 11B:
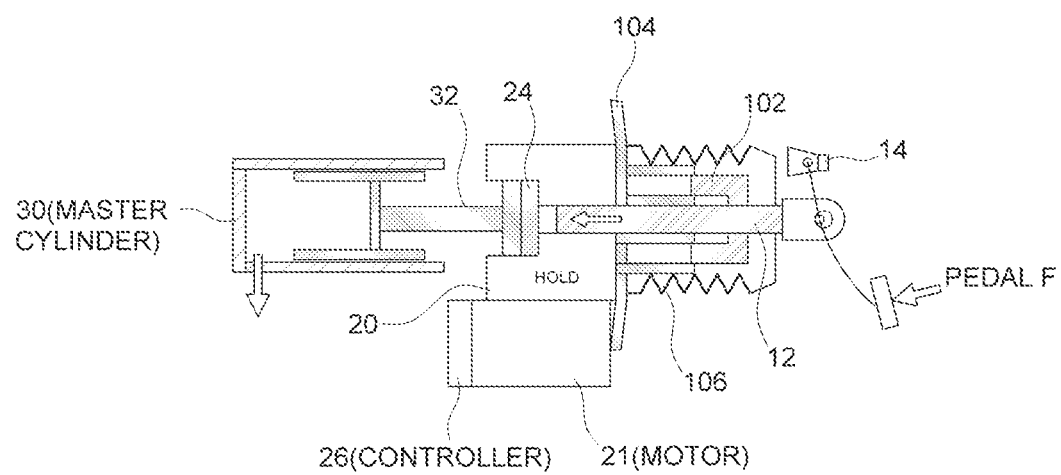

FIG. 11B is an operating state when the electric booster generates only the regenerative braking. In the instant case, the pedal push rod stroke Sp increases, whereas the boosting body stroke Sm is 0. In the instant case, the air gap G is present between $0<Sm-Sp+d0<d0$. The pedal push rod 12 is moved forward by the pedal input but does not come into contact with the reaction disk 24 due to the air gap G. The booster motor is maintained in a stopped state, and the boosting body 20 connected to the motor 21 is also in a stopped state. Because there is no force for pushing the reaction disk 24, the booster output and the hydraulic braking force are not generated. The drive motor of the vehicle generates the regenerative braking force. Therefore, a total braking force is equal to the regenerative braking force. The normal-time reaction force structure is made by the input of the pedal 11, but the conditional reaction force is not generated. Therefore, the pedal effort is the normal-time reaction force.

Figure 11C:
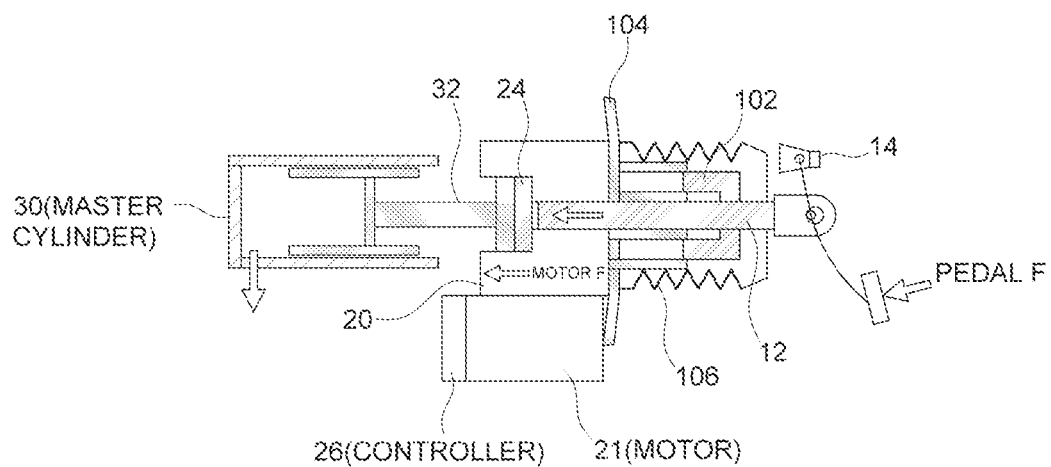

FIG. 11C illustrates an operating state in a section before the point C (contact point between the pedal push rod and the reaction disk) from the initial state of the electric booster, i.e., a section in which the regenerative braking reaches a maximum level and the hydraulic pressure of the booster motor is added. When the maximum regenerative braking is made of and the hydraulic pressure is generated by the booster motor, the pedal push rod stroke Sp increases, and the boosting body stroke Sm increases. In the instant case, the air gap ($G=Sm-Sp+d0$) is present between $0<Sm-Sp+d0<d0$. The pedal push rod 12 is moved forward by the input of the pedal 11 but does not come into contact with the reaction disk 24 due to the air gap G. After the regenerative braking reaches the maximum level, the booster motor 20 rotates, and the boosting body 20 moves forward so that the force is transmitted to the reaction disk 24. A total braking force is a sum of the regenerative braking force and the hydraulic braking force (the booster motor). The normal-time reaction force structure is made by the input of the pedal 11, but the conditional reaction force is not generated. Therefore, the pedal effort is the normal-time reaction force.

Figure 11D:
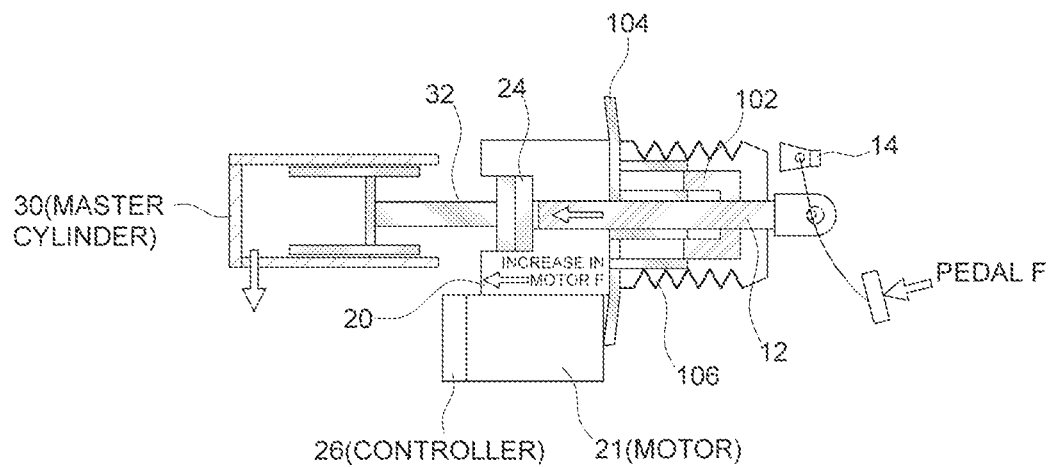

FIG. 11D illustrates an operating state at the regenerative braking release point in time of the electric booster. The pedal push rod stroke Sp increases, and the boosting body stroke Sm increases. In the instant case, the air gap G is present between $0<Sm-Sp+d0<d0$. In the situation in which the regenerative braking is released, the pedal push rod 12 moves forward but does not come into contact with the reaction disk 24 due to the air gap G. The torque of the booster motor increases, and the boosting body 20 also moves forward additionally so that the force is transmitted to the reaction disk 24. The regenerative braking force of the vehicle drive motor decreases, and at the same time, the hydraulic braking force, which is generated as the boosting body 20 pushes the reaction disk 24 in accordance with the operation of the booster motor, increases so that the hydraulic braking force is substituted for the braking force. A total braking force is a sum of the regenerative braking force and the hydraulic braking force (the booster motor). However, the regenerative braking force decreases, and the hydraulic braking force increases. The normal-time reaction force structure is made by the input of the pedal 11, but the conditional reaction force is not generated. Therefore, the pedal effort is the normal-time reaction force.

Figure 11E:
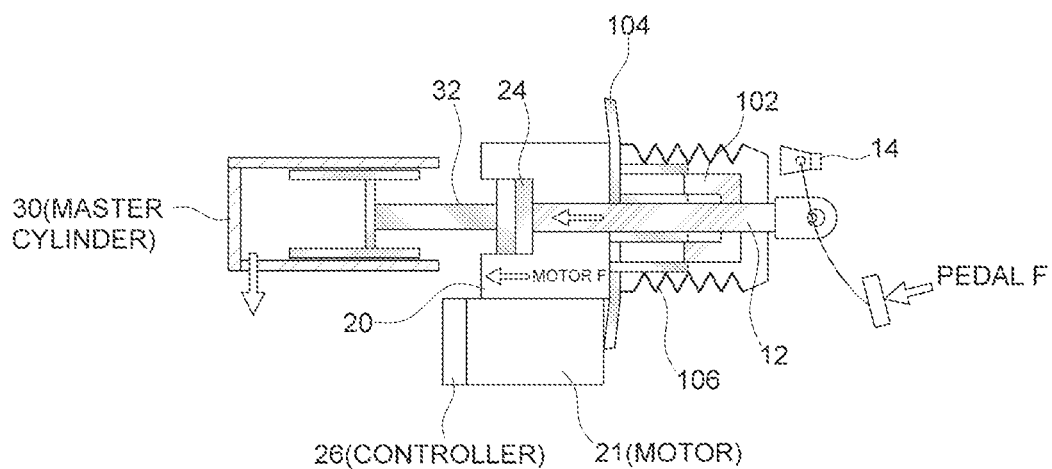

FIG. 11E illustrates an operating state after the point (point C in FIG. 8) at which the pedal push rod and the reaction disk are in contact with each other in the electric booster. The generated hydraulic braking force is a braking force made by a resultant force of a force of the booster motor and a force of the booster pedal. The pedal push rod stroke Sp increases, and the boosting body stroke Sm increases. The air gap G, i.e., $Sm-Sp+d0$, is equal to or greater than do. The pedal push rod 12 moves forward and comes into contact with the reaction disk 24 to transmit the force to the reaction disk 24. The torque of the booster motor increases, and the boosting body 20 also moves forward additionally so that the force is transmitted to the reaction disk 24. A total braking force is a hydraulic braking force. In the instant case, the hydraulic braking force is increased by the force of the booster motor and the booster pedal. The normal-time reaction force structure is made by the pedal input, and the conditional reaction force structure is also made. Therefore, the pedal effort is a sum of the normal-time reaction force (air compression reaction force) and the conditional reaction force (the reaction force of the reaction disk).

Figure 11F:
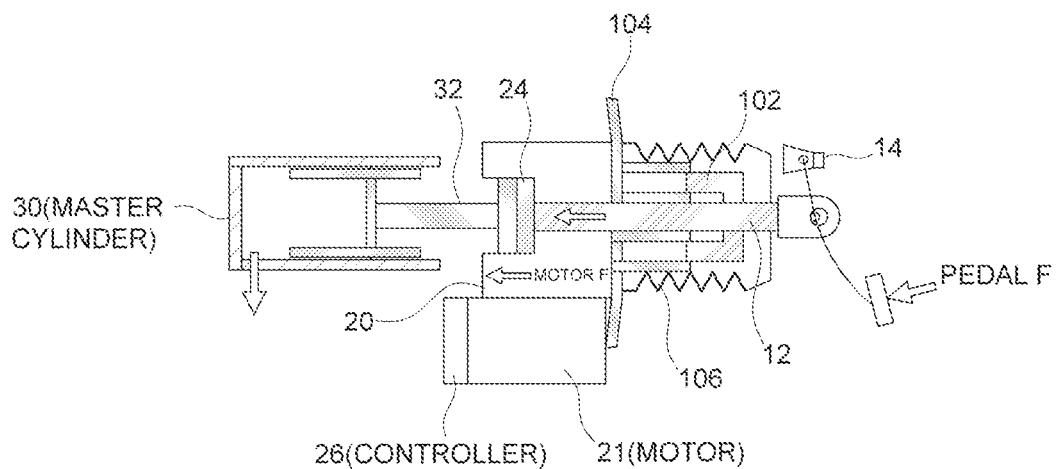

FIG. 11F illustrates an operating state when the electric booster reaches the knee point section. The generated hydraulic braking force is a braking force made by a resultant force of a force of the booster motor and a force of the booster pedal. However, the booster motor reaches the limit, and the braking force does not increase any further. The pedal push rod stroke Sp increases, and the boosting body stroke Sm increases. The air gap G, i.e., Sm−Sp+d0, is equal to or greater than do. In the instant case, a value of Sm−Sp decreases. The pedal push rod 12 moves forward and comes into contact with the reaction disk 24 to transmit the force to the reaction disk 24. In the instant case, the booster motor torque reaches a maximum level, and the force transmitted to the reaction disk 24 by the boosting body 20 is maintained constantly. A total braking force is a sum of a maximum value of the hydraulic braking force of the booster motor and the hydraulic pressure of the booster pedal. The normal-time reaction force structure is made by the pedal input, and the conditional reaction force structure is also made. Therefore, the pedal effort is a sum of the normal-time reaction force (air compression reaction force) and the conditional reaction force (the reaction force of the reaction disk).

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of controlling an electric booster for improving heterogeneous braking properties, the electric booster including a reaction disk, a boosting body configured to perform a translational motion by receiving driving power of a booster motor and generate a clamping force to the reaction disk, and a pedal push rod connected to a pedal and configured to come into contact with the reaction disk, the electric booster being subjected to braking control according to a braking map, the method comprising:
   a first braking control step of controlling, by a controller, and generating a reaction force at normal times in accordance with a pedal effort by compressing and expanding a fluid while moving the pedal push rod; and
   a second braking control step of controlling, by the controller, and generating the reaction force in accordance with the pedal effort in a condition in which the reaction disk and the pedal push rod are in contact with each other by detecting a size of an air gap between the reaction disk and the pedal push rod,
   wherein a normal-time reaction force structure used in the first braking control step includes a pedal return rod connected to one side of the pedal push rod and a housing into which the pedal return rod is inserted, the housing being configured to guide a movement of the pedal return rod, and wherein a closed space for the fluid is formed between the pedal return rod and the housing.

2. The method of claim 1, wherein the size of the air gap is determined in consideration of an initial state of the air gap and a relative movement amount between a stroke of the pedal push rod and a stroke of the boosting body.

3. The method of claim 1, wherein the first braking control step is performed by the controller when the air gap is formed in a situation in which regenerative braking is performed and then released.

4. The method of claim 3, wherein the first braking control step and the second braking control step are simultaneously performed by the controller when the size of the air gap is 0 after the regenerative braking is released.

5. The method of claim 1, wherein the first braking control step is performed by the controller when the air gap is formed before a knee point at which the boosting body cannot move any further.

6. The method of claim 5, including:
controlling, by the controller, braking performance so that the pedal push rod and the reaction disk come into contact with each other before the knee point to prepare for a rapid increase in reaction force by pedal force at the knee point and a buffer operation is implemented by increasing the reaction force of the reaction disk by controlling motor torque.

7. The method of claim 6, including:
setting the size of the air gap to position a point at which the pedal push rod and the reaction disk are in contact with each other between a regenerative braking ending point in time and the knee point.

8. The method of claim 5, including:
performing, by the controller, control to obtain a high braking force with respect to a pedal stroke by increasing torque of the booster motor with respect to the pedal stroke to make booster braking performance sport.

9. The method of claim 8, including:
performing, by the controller, control to determine a stroke when a motor limit is reached and set a point at which the pedal push rod and the reaction disk are in contact with each other before the motor limit is reached to prevent the knee point from being reached before the point in time at which the pedal push rod and the reaction disk are in contact with each other.

10. The method of claim 5, including:
performing, by the controller, control to obtain a low braking force with respect to a pedal stroke by decreasing torque of the booster motor with respect to the pedal stroke to make booster braking performance comfort.

11. The method of claim 10, including:
performing, by the controller, control to set a point at which the pedal push rod and the reaction disk are in contact with each other after a pedal stroke corresponding to regenerative braking release deceleration.

12. A electric booster apparatus, comprising:
a booster motor;
a controller electrically connected to the booster motor;
a reaction disk;
a boosting body mounted in a housing and configured to perform a translational motion by receiving driving power of the booster motor and generate a clamping force to the reaction disk;
a pedal push rod connected to a pedal and configured to come into contact with the reaction disk;
a pedal return rod connected to one side of the pedal push rod; and
a housing into which the pedal return rod is inserted to guide a movement of the pedal return rod,
wherein a closed space for a fluid is formed between the pedal return rod and the housing,
wherein the controller is configured for performing:
a first braking control step of controlling and generating a reaction force at normal times in accordance with a pedal effort by compressing and expanding the fluid while moving the pedal push rod; and
a second braking control step of controlling and generating the reaction force in accordance with the pedal effort in a condition in which the reaction disk and the pedal push rod are in contact with each other by detecting a size of an air gap for the fluid between the reaction disk and the pedal push rod.

13. The electric booster apparatus of claim 12,
wherein the first braking control step is performed when the air gap is formed in a situation in which regenerative braking is performed and then released, and
wherein the first braking control step and the second braking control step are simultaneously performed when the size of the air gap is 0 after the regenerative braking is released.

14. The electric booster apparatus of claim 12, wherein the first braking control step is performed when the air gap is formed before a knee point at which the boosting body cannot move any further.

15. The electric booster apparatus of claim 14,
wherein the controller is configured for controlling braking performance so that the pedal push rod and the reaction disk come into contact with each other before the knee point to prepare for a rapid increase in reaction force by a pedal force at the knee point, and
wherein the controller is configured for setting the size of the air gap to position a point at which the pedal push rod and the reaction disk are in contact with each other between a regenerative braking ending point in time and the knee point.

16. The electric booster apparatus of claim 14, wherein the controller is configured for performing control to obtain a high braking force with respect to a pedal stroke by increasing torque of the booster motor with respect to the pedal stroke to make booster braking performance sport.

17. The electric booster apparatus of claim 16, wherein the controller is configured for performing control to determine a stroke when a motor limit is reached and set a point at which the pedal push rod and the reaction disk are in contact with each other before the motor limit is reached to prevent the knee point from being reached before the point in time at which the pedal push rod and the reaction disk are in contact with each other.

18. The electric booster apparatus of claim 15, wherein the controller is configured for performing control to obtain a low braking force with respect to a pedal stroke by decreasing torque of the booster motor with respect to the pedal stroke to make booster braking performance comfort.

19. The electric booster apparatus of claim 18, wherein the controller is configured for performing control to set a point at which the pedal push rod and the reaction disk are in contact with each other after a pedal stroke corresponding to regenerative braking release deceleration.

* * * * *